US005241983A

United States Patent [19]

[11] Patent Number: 5,241,983
[45] Date of Patent: Sep. 7, 1993

Lagache

[54] DEVICE FOR AUTOMATICALLY CONTROLLING THE FLOW OF LIQUID INTO A TANK

[75] Inventor: Roland Lagache, Lège, France

[73] Assignee: Lafon Production S.A., France

[21] Appl. No.: 613,629

[22] PCT Filed Nov. 19, 1989

[86] PCT No.: PCT/FR89/00241
§371 Date: Nov. 19, 1990
§102(e) Date: Nov. 19, 1990

[87] PCT Pub. No.: WO 89/11446
PCT Pub. Date: Nov. 30, 1989

[30] Foreign Application Priority Data

Aug. 20, 1988 [FR] France ............ 88 06979

[51] Int. Cl.[5] ............ F16K 31/22; F16K 33/00

[52] U.S. Cl. ............ 137/448; 141/198; 251/298; 137/630

[58] Field of Search ............ 137/386, 410, 411, 416, 137/434, 448, 513.3, 527, 630, 630.15, 445, 875; 141/198, 205, 213; 251/298, 305

[56] References Cited

U.S. PATENT DOCUMENTS

| | | | |
|---|---|---|---|
| 717,450 | 12/1902 | Prowant | 137/448 |
| 2,569,110 | 9/1951 | McGillis et al. | 137/448 |
| 2,796,082 | 6/1957 | Green et al. | 137/630.15 |
| 3,078,867 | 2/1963 | McGillis et al. | 137/416 |
| 3,279,491 | 10/1966 | Brady | 137/448 |
| 3,442,488 | 5/1969 | Adams | 251/305 |
| 3,595,272 | 7/1971 | Conklin | 137/875 |
| 3,963,041 | 6/1976 | McGillis | 141/198 |
| 4,308,894 | 1/1982 | Carpentier | 222/450 |
| 4,667,711 | 5/1987 | Draft | 137/448 |
| 4,986,320 | 1/1991 | Kesterman et al. | 137/445 |

FOREIGN PATENT DOCUMENTS

| | | | |
|---|---|---|---|
| 1600857 | 12/1970 | Fed. Rep. of Germany | 251/305 |

*Primary Examiner*—George L. Walton
*Attorney, Agent, or Firm*—Jenner & Block

[57] ABSTRACT

The overfill device is of the type comprising a filling tube having a vertical axis and disposed in the tank, a butterfly valve disposed in the filling tube and movable between a vertical opening position and a closing position which corresponds to a bearing of the valve on a valve seat provided in the filling tube, and a float connected to the flap valve and capable of shifting the flap valve between the opening and closing positions, and is characterized in that the valve seat is inclined relative to the vertical axis of the filling tube and the valve is mounted on a pivot pin which is disposed between ends of the valve and is eccentric relative to the vertical axis of the filling tube.

5 Claims, 3 Drawing Sheets

DEVICE FOR AUTOMATICALLY CONTROLLING THE FLOW OF LIQUID INTO A TANK

The present invention relates to an automatic overfill device for the filling of tanks having an incorporated float whereby it is possible to avoid the overflow of liquids when the tanks are being filled.

Overfill devices are known for the filling of tanks having an incorporated float inside the tanks in the extension of the filling orifices, said overfill devices being constituted by a flap valve pivotally mounted on a pin (located outside of the perimeter of the flap) inside a tubular body extending the filling orifice. The valve is connected to a lever arm provided outside the tubular body with a float so as to progressively close the filling pipe as the level of the liquid in contact with the float rises in the tank. When the valve closes the pipe in a fluidtight manner and the gate valve of the filling or supply tank is closed, it is necessary to decompress the filling pipe between the supply tank and the flap valve in order to empty the liquid contained in the pipe. The flap valve is acted upon as by means of complex mechanical devices or the float is acted upon; this type of emptying may cause the tank to overflow if a sufficient allowance has not been provided for, this allowance being difficult to determine in view of the variable lengths of the filling pipes.

Also known for emptying the filling pipes is the provision of a poppet valve which is progressively opened, as the flap valve is progressively closed, by means of an articulated cam. This type of arrangement has at least one drawback; it requires the constant supervision of the filling flow rates so as to determine the lowest rate which signifies that the flap valve has closed the filling orifice so as to make it necessary to close the gate valve of the supply tank. The liquid contained in the pipe is discharged through the orifice opened by the poppet valve; as this detection of the change in the flow rate is very delicate, bearing in mind, the progressive closure of the flap valve and the extent of the flow of the liquid through the orifice opened by the poppet valve, the tank very often overflows.

There is also known from French Certificate of Addition No. 2 299 264 a device which is adaptable on the tank filling pipe and which, when the level of the liquid rises in the tank, acts through a float, connected by flexible wires, on an articulated arm so as to progressively release a principal flap valve so that the latter is positioned for stopping the flow of the filling liquid. This causes the closure of said pipe by the bearing of said flap valve on its seat, the pressure of the liquid contained in the pipe causing the closure of a secondary flap valve connected to the principal valve, the liquid then flowing through a central opening provided in the principal flap valve so that the level of the liquid rises in the tank. This rise in the liquid level causes, through the agency of the float and the connecting wires, the displacement of the articulated arm, which closes the central opening through which the liquid flows, and permits, through a washer provided with an opening, if the supply gate valve is closed at that moment, the flow of the liquid contained in the pipe and also through a leak passage provided on the principal flap valve or on the seat of the latter. If on the other hand the gate valve is not closed, the flow of the liquid through the opening and the leak passage continues to cause the rising of the liquid in the tank until a shoulder fixed on the rod receiving the washer comes to close said opening. This type of device is complex and the emptying of the supply pipe after closure of the gate valve is relatively long.

In U.S. Pat. No. 4,667,711, there is described an overfill device comprising a tubular body in which is disposed a valve seat which is horizontal relative to the vertical axis of the body, and a valve, on one hand pivotally mounted on one of the vertical walls of said body and, on the other hand connected to a float mounted at the end of a flexible and deformable element such as a spring. The tubular body is further provided with a slot or opening which is large enough to enable the float and the spring to be disposed in said body after folding so as to facilitate the insertion of said body in an access tube connected to the tank to be filled.

However, such an overfill device has drawbacks.

Firstly, the closure of the flap valve on its seat is achieved solely in the upper position of the float, the discharge of the liquid contained in the filling pipe between a control gate valve mounted on the truck and said flap valve occurring through an orifice provided in the center of said flap valve.

Secondly, it is necessary to provide a seat and a flap valve having a complex configuration such as a saddle shape.

Thirdly, in order to render the body fluidtight, it is essential to provide a closure plate closing the opening provided for the passage of the float and a rod system for shifting said plate.

An object of the invention is to overcome the aforementioned drawbacks.

The invention provides an automatic tank overfill device of the type comprising a filling tube having a vertical axis and disposed in said tank, a butterfly valve disposed in said filling tube and movable between a vertical opening position and a closing position which corresponds to a bearing of said valve on a valve seat provided in said filling tube, a float semi-elastically connected to said flap valve and capable of shifting said valve between the opening and closing positions, characterized in that the flap valve seat is inclined relative to the vertical axis of said filling tube, and the valve is mounted on a pivot pin which is disposed between ends of the valve and is eccentric relative to the vertical axis of the filling tube.

The inclination of the valve seat limits, thereby the angle of the pivoting of the float to a low value permitting an easy retraction of said float outside and alongside the wall of the filling tube.

The eccentricity of the valve relative to the vertical axis of the filling tube permits achieving a mechanical unit which does not present an equality of forces on the valve. Consequently, the closure of the valve is not effected merely by the pivoting of the float but also by the fluid which exerts a pressure on the valve. Indeed, for an intermediate position of the flap valve in the filling tube and owing to the eccentricity which creates a lever arm, the valve may close even when the float has not reached the upper closing position thereof.

Further features and advantages of the invention will appear more clearly from the following description with reference to the accompanying drawings which are given as a non-limitative example.

Figure 1:
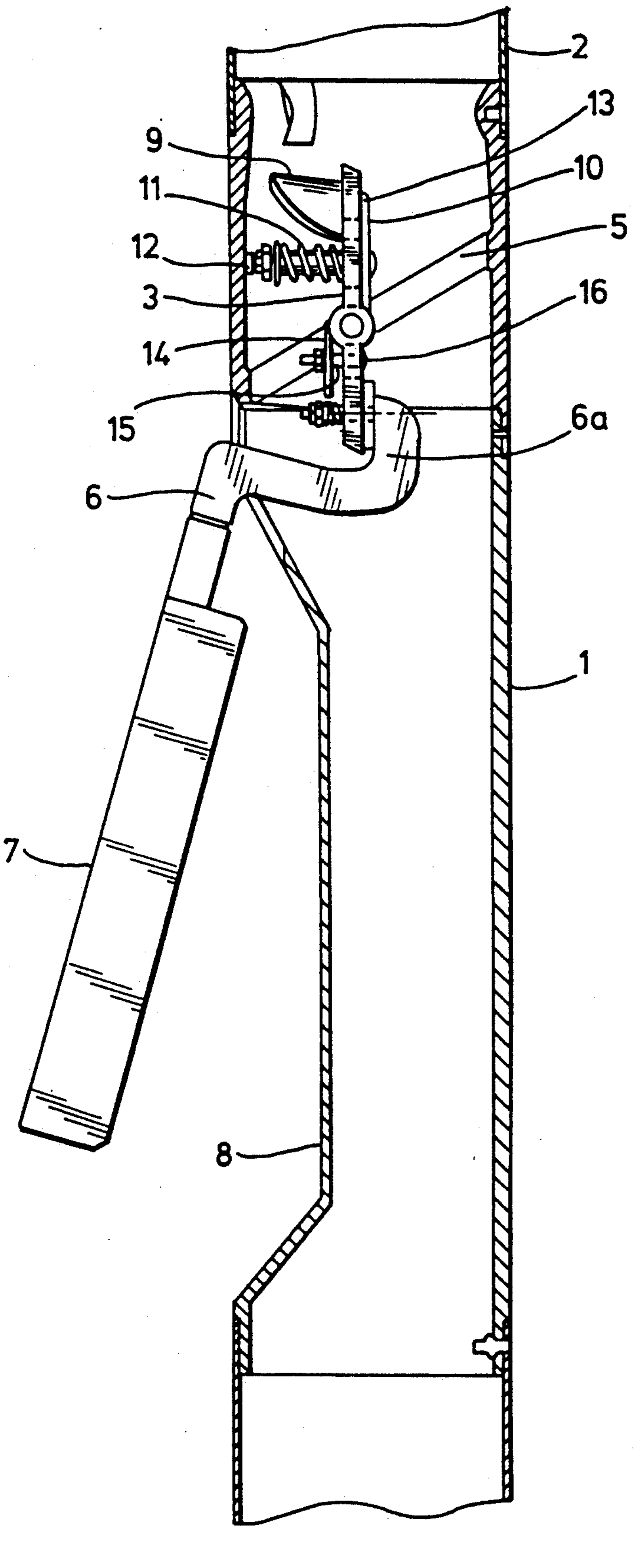
FIG. 1 shows the overfill device placed in position in a tank.
Figure 2:
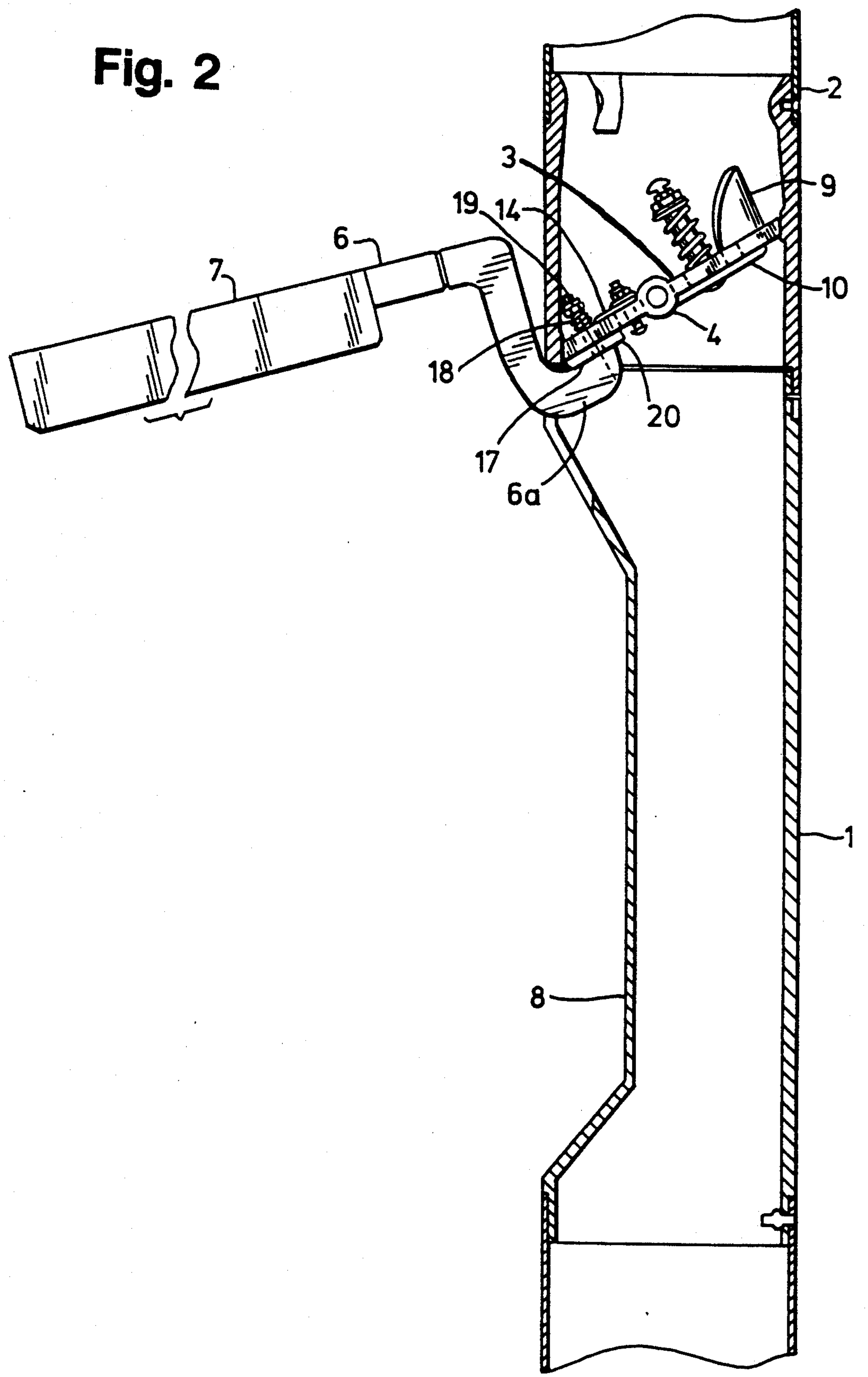
FIG. 2 shows the overfill device in the position for stopping the flow.
Figure 3:
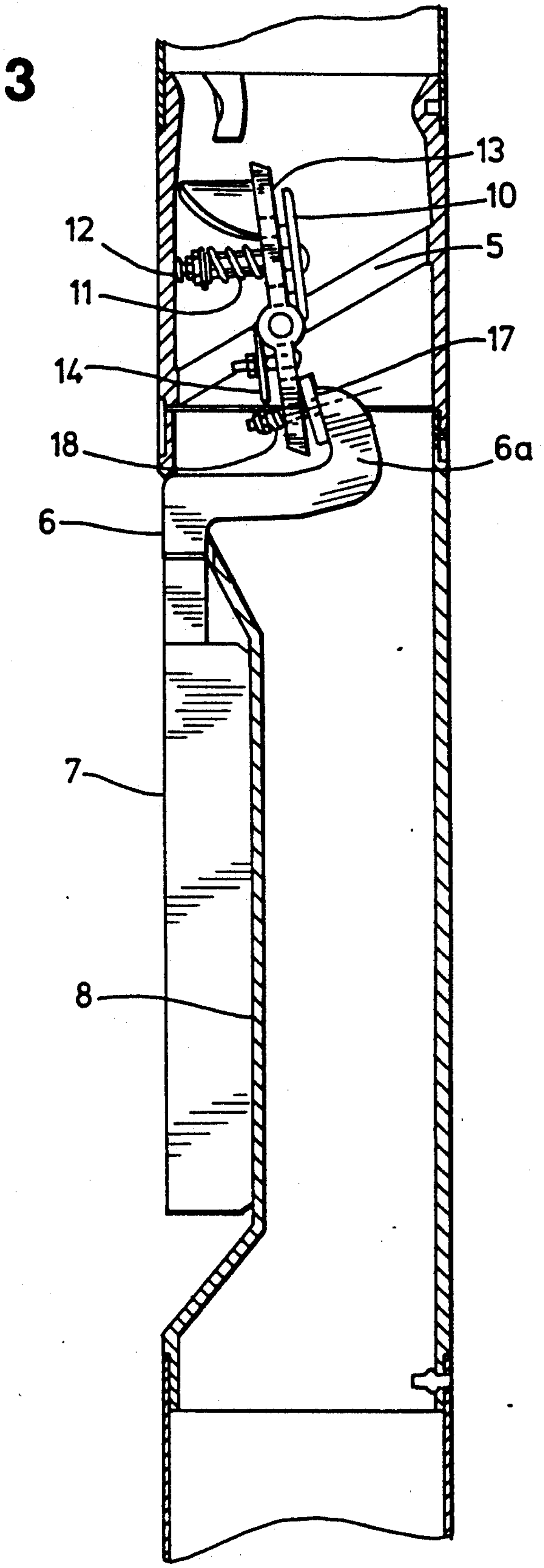
FIG. 3 shows the position of the float when placing the overfill device in the tank.

As shown in FIGS. 1 to 3, the tank overfill device comprises a tubular body 1 adapted to and extending the tank filling orifice 2. Maintained inside the body 1 is a butterfly valve 3 which is connected to a pivot constituted by an eccentric transverse pin 4, this pin 4 being disposed between the ends of valve 3 and eccentric relative to the vertical axis of the tubular body 1 in order to encourage the tilting of the valve 3 at the end of the filling and the closure of the tubular body 1 (as shown in FIG. 2) by the bearing of the valve 3 against a seat 5 provided in an inclined position inside the body 1. As pointed out above, this eccentricity results in an inequality in the forces applied to valve 3 by the pressure of liquid flowing against it. In particular, the force applied to the larger fraction of the upper surface of valve 3 (on the right-hand side in FIG. 2) is greater than the force applied to the smaller fraction of that surface (on the left-hand side in FIG. 2), which operates to cause the valve to close more quickly than if pin 4 were located in the center of the valve.

Preferably, the inclination of the seat 5 is between 30° and 60° and preferably about 45° relative to the vertical axis of the tubular body 1.

The valve 3 is extended by an arm 6 provided outside the body 1 with a float 7 acting as a counterweight for maintaining the valve 3 in the open position during the filling of the tank. Upon contact with the liquid when the level rises in the tank, the float pivots the valve 3 (in the clockwise direction in FIG. 1) and consequently progressively closes the tubular body.

The valve 3 is provided with a deflector 9 in the form of a portion of a cylinder, which is rigidly mounted on the upper face of the valve remote from the connection of the arm 6, and adjacent the perimeter of the valve. This member, with its concave side directed downward when valve 3 is fully open, deflects the liquid entering filling tube 1 from above during the filling of the tank when the valve 3 is in the fully open position. As will be seen from FIG. 1, deflector 9 deflects liquid that enters tubular body 1 from above away from the upper face of butterfly valve 3 and laterally toward each side of the tube, so that the force exerted by downwardly rushing liquid does not close valve 3 prematurely. Valve 3 is provided with two poppet valves 10 and 14 provided with springs 11 and 15. As shown in the drawing, in each case the spring is a helical compression spring supported by a rod positioned co-axially with the spring, which rod extends from the poppet valve through its associated opening in butterfly valve 3 to the opposite side of the latter valve. The spring is positioned around the rod, to bear against that opposite side, or face, of the butterfly valve, with its other end secured to the end of the rod so that the spring is compressed when the poppet valve moves away from valve 3. As will be seen, no part of the resulting elastic return means is in the case of either one of those poppet valves 10 and 14 connected to any structure that is external to butterfly valve 3. The springs exert a force which is adjustable by means of screws 12 and 16 or they are calibrated. As will be explained, these two valves serve as relief valves for two different purposes. Valve 10 serves as a shock wave-damping valve, and valve 14 serves as a valve to accelerate terminal flow out of tubular body 1.

As is well known in this art, when a valve such as valve 3 in an overfill device for controlling the flow of liquid into a tank is suddenly closed, a shock wave is created in tubular body 1 above the valve. The shock wave is further propagated into the filling pipe or hose that connects the overfill device to a supply tank truck or other source of liquid. In the absence of a damping valve such as valve 10, the propagation of the shock wave between valve 3 and the control gate valve of the tank truck will often, as is known to those skilled in the art, cause successive openings and closings of valve 3 in relation to seat 5, to produce what may be called "hammering."

The valve 10 has for its function to absorb by the opening thereof the shock wave and the increased pressure of the liquid in the pipe or tube 1 upon the sudden closure of the valve 3 which occurs after the clockwise rotation of the valve 3 to the position shown in FIG. 2 that is brought about by the float 7 and the arm 6 upon contact with the liquid contained in the tank. This sudden closure is produced by the flow pressure of the filling liquid, which exceeds the effect of the weight of the arm 6 and float 7. When valve 110 opens in response to the sudden increase in pressure that occurs above main valve 3 upon the sudden closing of the main valve, the increase in pressure is reduced and the shock wave is very rapidly damped and valve 3 no longer tends to open and shut in a "hammering" fashion.

As soon as the normal pressure is reestablished, the damping valve 10 resumes contact with its seat 13 (on the bottom face of main valve 3) under the action of the spring 11, the flow of the liquid through the overfill device being then interrupted since the valve 14 is made to bear against its seat 20 (on the top face of main valve 3) by the pressure of the liquid.

In order to avoid the deterioration of the arm 6 and float 7 by the shock wave, the arm 6 is connected to the valve 3 in a semi-elastic manner by means of a pin 17 with a nut 19 screwed thereon and a return spring 18 interposed between the nut and the valve 3 for example.

After the flow of the liquid through the overfill device is interrupted and after the gate valve of the filling system (such as a supply tank truck) is closed, the liquid contained in the filling pipe between the gate valve and the overfill device continues its flow, but at a reduced rate, through a leak passage provided on the seat 5 (not shown) which may be an orifice. As will be understood, since at this time the gate valve has been closed, the slight leakage just described produces a decompression in the liquid in tubular body 1 and in the rest of the filling conduit. Thus, as this leakage flow continues, the pressure above valve 3 falls until it reaches a value predetermined by the stiffness of spring 15. At this time, the flow is accelerated owing to the opening of the terminal flow-accelerating valve 14 (which moves diagonally upward and to the left from the position shown in FIG. 2) by the extension of the spring 15, which is calibrated or adjusted to the desired force by the screw 16. This occurs toward the end of the decompression of the filling pipe.

When this decompression has continued until the pressure on the main valve 3 has almost disappeared, this main valve partly pivots (counterclockwise in FIG. 2) owing to the weight of the arm 6 and float 7, which are out of the filling liquid when the valve 3 is in the completely closed position, which then permits the complete emptying of the filling pipe. In other words, poppet valve 14 serves as a second relief valve, this time to accelerate liquid flow that would otherwise proceed slowly through the above mentioned leak passage.

In order to permit placing the overfill device in its operative position within the tank being filled, the arm 6 and the float 7 are retracted within a recess 8 provided on the body 1. The major part of the retraction is rendered possible owing to the position of the deflector 9 relative to the end of the screw 12 of the valve 10 which, by compression of the spring 11 (from its condition shown in FIG. 1 to its condition shown in FIG. 3) causes the counterclockwise movement of main valve 3 that accompanies the retraction of arm 6 and float 7 to terminate at a predetermined point before the upper edge of the deflector 9 bears against the inner surface of the body 1. Depending on the stiffness of spring 11 on pin 12 and of spring 17 on pin 18, the retraction of arm 6 and float 7 may be completed by pivoting arm 6 and pin 17 with respect to main valve 3 in the counterclockwise direction from the position shown in FIG. 1 to the position shown in FIG. 3. With arm 6 and float 7 thus retracted, the overfill device of this invention can be inserted into the tank being filled through filling orifice 2. The arm 6, the float 7 and the valve 3 resume their normal open position upon the extension of the spring 11 and the return of the valve 10 to its seat 13 (See FIG. 1).

As shown in FIG. 2, arm 6 attaches float 7 to the butterfly valve 3 through "J"-shaped connecting member 6*a*. (This member is seen as a reverse "J" in FIG. 2 because of the angle from which it is viewed.) Connecting member 6*a* is arranged and adapted to permit float 7 to rise, to the elevated position it occupies when valve 3 is closed, without being impeded by the portion of the side wall of tube 1 that is located above recess 8. The "J"-shaped connecting member 6*a* is also arranged and adapted to permit float 8 to pivot down into the position it occupies in recess 8 when in its extreme bottom position. Specifically, the long, upright arm of the "J" form is positioned at the end of arm 6 normal to the longitudinal axis of float 7, with the open side of the "J" facing away from arm 6. The short arm of the "J" is attached to the butterfly valve near the edge of the valve.

I claim:

1. A device for limiting the flow of fluid into a tank comprising:
   - a filling tube having a vertical axis and adapted for disposition in the tank for allowing fluid to flow into the tank;
   - a float that is external to the filling tube
   - a valve seat disposed in said filling tube and inclined relative to said vertical axis of said filling tube;
   - a butterfly valve having a top and a bottom face, and at least one aperture, said butterfly valve being disposed in said filling tube, said butterfly valve movable between a vertical open position and a closed position, said closed position corresponding to a bearing of said bottom face on said valve seat;
   - mounting means for mounting said butterfly valve for pivotable movement about a pivot axis, said pivot axis being eccentric to said vertical axis, so that when said butterfly valve is in a position intermediate said open and closed positions, fluid flowing through said filling tube can impose an eccentric closing force on said butterfly valve which urges said butterfly valve into said closed position;
   - a relief valve mounted to said butterfly valve and having elastic return means for urging said relief valve to a closed position in which it bears against said bottom face of said butterfly valve to close said aperture; and
   - connecting means for connecting said float to said butterfly valve so that the weight of said float urges said butterfly valve into said open position, and the buoyancy of said float urges said butterfly valve into a position intermediate said open and closed positions as the tank fills with fluid;
   - wherein said butterfly valve is subjected to said closing force when in said intermediate position, and wherein said float is lifted upward by the movement of said butterfly valve toward said closing position when said closing force exceeds the force imposed by the weight of said float.

2. The device according to claim 1, wherein said elastic return means comprises a spring mounted on a rod, said rod extending normally from the upper face of said butterfly valve to engage an inner surface of said filling tube as said butterfly valve approaches said open position, said elastic return means urging said butterfly valve away from said open position when said rod is engaged with said inner surface.

3. The device according to claim 1, further comprising a deflector rigidly mounted to the upper face of said butterfly valve and having a curved body that defines a concave side, said deflector being mounted near the perimeter of said butterfly valve so that when said butterfly valve is in said open position, said concave side faces downward and toward said pivot axis; whereby said deflector reduces the closing force imposed on said butterfly valve by fluid flowing through said tube.

4. The device according to claim 1 wherein said connecting means is semi-elastically connected to said butterfly valve.

5. The device according to claim 4 wherein said connecting means includes a "J" shaped member.

* * * * *